United States Patent [19]
Haddad

[11] 3,926,765
[45] *Dec. 16, 1975

[54] ELECTROCHEMICAL ELECTRODE STRUCTURE

[75] Inventor: Ihsan A. Haddad, Bedford, Mass.

[73] Assignee: Instrumentation Laboratory, Inc., Lexington, Mass.

[ * ] Notice: The portion of the term of this patent subsequent to Dec. 17, 1991, has been disclaimed.

[22] Filed: Dec. 20, 1973

[21] Appl. No.: 426,513

Related U.S. Application Data

[63] Continuation-in-part of Ser. No. 350,774, April 13, 1973, Pat. No. 3,855,100.

[52] U.S. Cl. .......... 204/195 F; 204/195 R; 204/279
[51] Int. Cl.² ........................................ G01N 27/30
[58] Field of Search ........... 204/195, 1 T, 252, 263, 204/279; 324/30 R, 30 C

[56] References Cited
UNITED STATES PATENTS

| | | | |
|---|---|---|---|
| 3,505,196 | 4/1970 | Dahms | 204/195 |
| 3,681,205 | 8/1972 | Ducksbury et al. | 204/1 T |
| 3,763,422 | 10/1973 | MacPhee et al. | 324/30 R |

*Primary Examiner*—G. L. Kaplan

[57] ABSTRACT

An electrochemical electrode system includes a first chamber adapted to contain electrolyte and a second chamber adapted to contain the material to be analyzed. An opening is associated with each chamber and the openings are in juxtaposed relation to one another. The system further includes a flow control member that is disposed between the two openings. Structure is provided for sealing the two openings to the flow control member in position between the openings.

17 Claims, 4 Drawing Figures

ELECTROCHEMICAL ELECTRODE STRUCTURE

This application is a Continuation in part of application Ser. No. 350,774, filed Apr. 13, 1973, now U.S. Pat. No. 3,855,100.

SUMMARY OF INVENTION

This invention relates to electrochemical electrode structures and more particularly to structures for liquid junctions in electrochemical electrode structures.

In electrochemical measurements, two electrodes—a measuring electrode and a reference electrode—are commonly employed in an arrangement whereby the potential difference between the two electrodes provides an indication of the concentration of a specific ion in the solution of interest. An electrochemical electrode structure of this type is used for measuring hydrogen ion concentration in a solution, for example, and a particular use of such an electrode system is for pH blood measurements.

A typical measurement of the pH of blood with a particular electrode system involves the measurement of the sum of a series of potentials: the potential of a silver silver chloride reference electrode; the potentials on the inside and outside surfaces of a pH sensitive glass membrane, the blood sample to be measured being on the inside surface of the glass membrane; the junction potential occuring at the interface of the blood and a reference electrolyte solution (typically saturated KCl); and the potential of a calomel reference electrode. The potential generated on the blood side of the pH sensitive glass membrane ($E_{pH}$) and the liquid junction potential ($E_j$) are dependent on the composition of the blood sample. $E_{pH}$ is related to the acidity or pH of the blood; and $E_j$ is related to the differences of ionic mobilities in the blood and the reference electrolyte solution (due either to dissimilarity in composition and/or concentration), the three dimensional geometry of the blood-electrolyte interface, and the presence of colloidal particles in the blood.

A major source of difficulty in making blood pH measurements resides not in the pH electrode itself but at the interface (reference junction) between the blood and the reference electrolyte solution. Reference junctions can generally be divided into two categories: open junctions and restricted flow junctions. The open junction can be considered a single orifice of macroscopic dimensions, while the restricted flow junction can be considered a collection of microscopic open junctions, such as provided by ceramic plug. The restricted flow type of junction offers advantages over the open type as flow of the reference solution is limited and valving and pressure differential requirements are simplified or eliminated. However, the restricted flow junction must have well-defined mechanical characteristics, partricularly for blood pH measurements, which characteristics are uniformly maintained and not distorted during use of the system. Also, the characteristics of restricted flow junctions can change over a period of time, due for example to the clogging of a portion of the microscopic channels or pores and hence the junction structure may require periodic replacement or rejuvenation.

It is an object of this invention to provide a novel and improved ionic junction arrangement of the restricted flow type for an electrochemical electrode system.

Another object of the invention is to provide a novel and improved leak structure arrangement of the restricted flow type which is particularly adapted for use in electrochemical measurements of blood.

Another object of the invention is to provide a novel and improved arrangement which facilitates replacement of a restricted flow ionic junction component when the effectiveness of such component has become impaired.

In accordance with a feature of the invention, there is provided an electrode system for the electrochemical analysis of a sample which includes structure that defines a first chamber adapted to contain an electrolyte and structure that defines a second chamber adapted to contain the material to be analyzed. Each chamber defining structure includes a surface in which an opening in communication with its chamber is disposed and in system operation the openings are in juxtaposed relation to one another. A flow control member is disposed between the openings for establishing an ionic junction between the electrolyte and the sample material to be measured by the electrode system. Cooperating guide structure establishes straight line motion of one opening defining member towards the other and alignment of the two chamber openings. Securing structure maintains the openings in juxtaposed sealing relation while not imposing shear force on the flow control member. The invention facilitates the replacement of flow control members without impairing critical flow characteristics of such members.

In accordance with another feature of the invention, an electrochemical electrode system includes a flow control member that has a plurality of porous flow control sections of identical characteristics connected together for sequential positioning between an electrolyte chamber opening and a sample chamber opening. The member is movable to replace one section by another section between the openings, and structure is provided for sealing the two openings to the flow control section in position between the openings.

In preferred embodiments, the flow control member is a thin membrane of hydrophilic material and in a particular embodiment, the membrane is a ten-micron thick strip of polycarbonate material with a multiplicity of pores each about 0.1 micron in diameter which provide a flow rate with a 25 centimeter head of potassium chloride of about 0.3 microliter per minute per square millimeter of strip material. That membrane material is further characterized by smooth surfaces and a low electrical resistivity when electrolyte is in the pores. The membrane may take earliest forms, for example a discrete element, or a series of sections in a strip membrane that has a leading end secured to a take up member and a trailing end secured to a supply member. Such membrane members are easily contaminated or mechanically damaged so that their effectiveness as leak junction members are impaired and the invention in particular aspects minimizes such potential damage.

In a particular embodiment a membrane strip is disposed in a groove in one of the structures and a juxtaposed clamp surface is spring biased against the membrane. The sample chamber includes a sample flow path, at least a portion of which is defined by a pH sensitive membrane. Disposed on the other side of the pH sensitive membrane is a sensing electrode. The flow path bends at the point that the sample flows past the leak junction membrane, and vacuum applied to the sample flow path induces a sample to be analyzed into the flow path. Disposed on the other side of the leak junction membrane is a reference electrode disposed in electrolyte that is in communication with the leak junction member with the pressure on the electrolyte side of the leak junction normally slightly greater than the sample side.

The invention provides a restricted leak junction arrangement in an electrochemical electrode system which functions to reproduceably provide junction potential measurements of accuracy comparable to those obtained with open junction types of systems. The leak junction member may be a discrete member or connected to other membrane portions. Potential damage to the leak junction membrane for example by application of a twisting or shearing force is minimized while enabling the membrane to be readily changed. The system operates with excellent stability, time response characteristics, and uniformity in a flow through system which can be subjected to temperature and pressure cycles such as encountered in automated fluid handling systems.

Other objects, features and advantages will be seen as the following description of a particular embodiment progresses, in conjunction with the drawings, in which.

DESCRIPTION OF PARTICULAR EMBODIMENT

Figure 1:
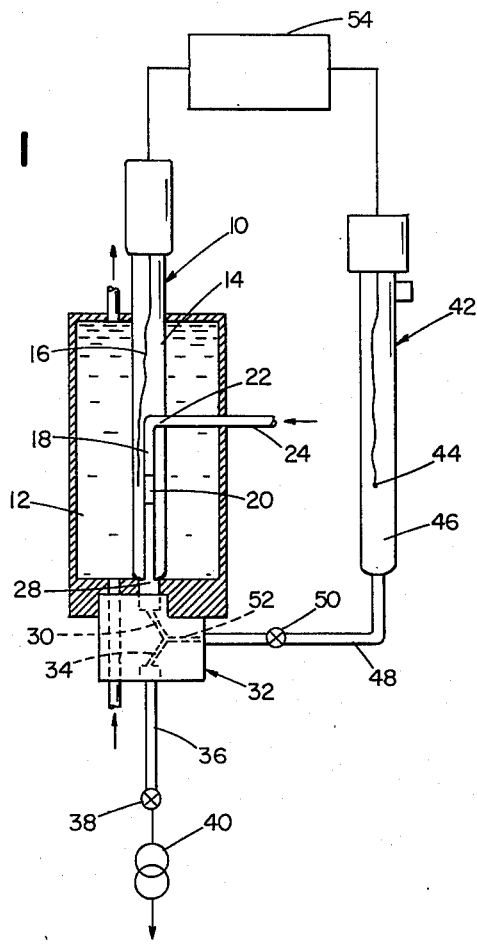
FIG. 1 is a diagrammatic view of an electrochemical electrode system in accordance with the invention.

In FIG. 1 there is shown a pH electrode 10 in a water bath 12. The pH electrode 10 includes a chamber 14 having a silver silver chloride sensing electrode 16 in it. A glass tube 18, one section 20 of which is composed of pH sensitive glass is also in chamber 14 and has an inlet end 22 connected to sample inlet 24 and an outlet end 28 that is connected to conduit 30 of liquid junction structure 32. Liquid flows from the liquid junction structure through tube 34. Flow through tube 36 is controlled by valve 38 (which is optical) and positive displacement pump diagrammatically indicated at 40.

A cooperating reference electrode 42 including an $Hg/Hg_2Cl_2$ (calomel) electrode 44 disposed in chamber 46 that is filled with a suitable electrolyte such as KCl. Tube 48 supplies electrolyte via valve 50 to conduit 52 in the liquid junction structure 32. Electrodes 16 and 44 are connected to measuring circuit 54 which provides an indication of the sum of potentials in the system between electrode 10 and 42.

Figure 2:
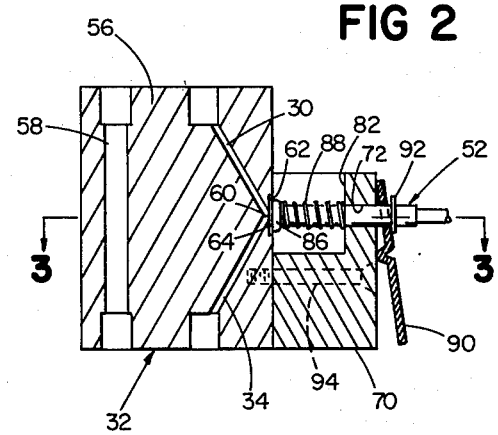
FIG. 2 is a sectional view showing details of the liquid junction structure employed in the embodiment shown in FIG. 1.
Figure 3:
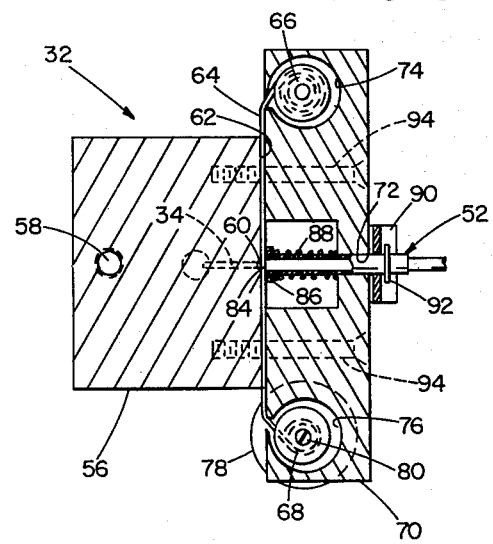
FIG. 3 is a sectional view taken along the line 3—3 of FIG. 2.
Figure 4:
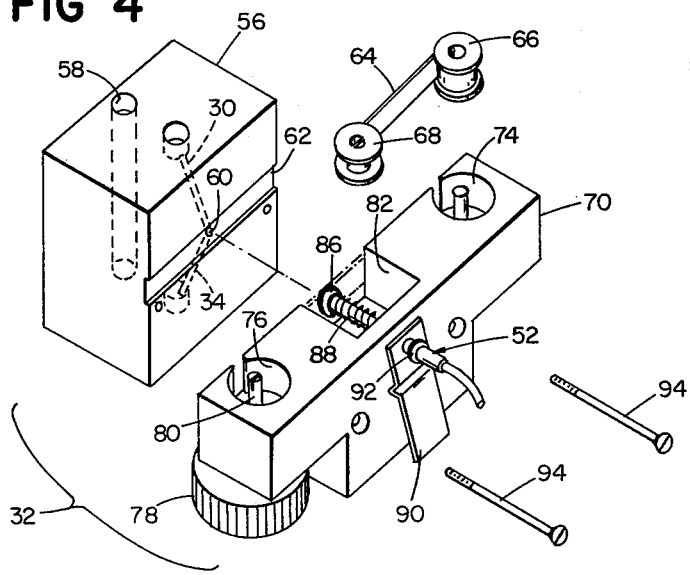
FIG. 4 is a perspective diagrammatic view showing features of the liquid junction structure shown in FIGS. 2 and 3.

Additional details of the liquid junction structure 32 may be seen with reference to FIGS. 2–4. That structure includes member 56 that has through passage 58 connected to water bath 12; inlet blood flow passage 30, 0.75 millimeter in diameter, that is connected to outlet 28 of electrode 10, and exit passage 34 of the same diameter as passage 30. Passages 30 and 34 are disposed at an angle of 120° to one another, and at the junction of passages 30 and 34, an external port 60 (FIG. 4) about 1 millimeter in diameter, is formed. Guide structure for the flow control member in the form of groove 62 extends past port 60. The base of the groove 62 provides a support and clamp surface for the flow control member 64. Disposed in groove 62 is a flow control member in the form of strip 64 of polycarbonate material which extends from supply reel 66 to take up reel 68.

Cooperating member 70 has a surface that overlies and is clamped against the face of block 56 and maintains flow control tape 64 in groove 62. Member 70 also has a guide bore 72 in which conduit 52 is slidably received and two spaced recesses 74, 76 in which reels 66, 68, respectively, are received. A drive disc 78 connected to shaft 80 in recess 76 enables takeup reel 68 to be easily rotated.

The end of rigid conduit tube 52 is disposed in recess 82. Conduit outlet port 84 is disposed in clamp member 86. Spring 88 biases clamp disc 86 towards flow control strip 64 in groove 62 and maintains the clamp surface 82 and groove base in juxtaposed fluid sealing relation while not imposing shear force on the clamped flow control member 64. Lever 90 cooperates with disc 92 also carried by conduit 52 and allows clamp member 86 to be retracted (moved towards the right in FIG. 2) compressing spring 88. Bolts 94 secure member 70 to member 54.

The polycarbonate strip 64 is about ten microns in thickness and has a multiplicity of parallel through passages or pores, each about 0.1 micron in diameter, the pore density being about $3\times10^8$ square centimeter. These passages or pores thus provide a multiplicity of minute ionic junction passages. Spring 88 clamps conduit port 84 against strip 64 to seal that strip against orifice 60. The potassium chloride electrolyte in chamber 46 is supplied to orifice 84. This junction system provides a flow rate of about 0.01 microliter per minute per square millimeter per centimeter head of KCl; and has an electrical resistance of about 2 ohms.

In operation, a sample of blood is induced into tube 18 and liquid junction structure 32 under the influence of pump 40. A measurement of the potentials by circuitry 54 provides an indication of the pH of the blood sample. After the measurement is completed, the blood sample is removed from the system by pump 40 and the flow passage is cleaned by passing a flushing solution serially through tubes 24, 18, 30, 34 and 36. The leak structure 32 provides a smooth flow of sample and cleaning solution past orifice 60 such that the exposed surface of membrane 64 is efficiently and quickly cleaned. Should it be desired to change the leak junction membrane, valve 50 is closed and clamp member 90 operated to release the clamping pressure of member 66 on tape 64. Then thumb wheel 78 is rotated to advance a fresh section of membrane in front of port 60. Lever 90 is then released allowing spring 88 to urge conduit 52 axially forward to clamp orifice 84 against the new section without imposing shear stress on the new membrane section. Valve 50 is opened and the system is ready for further operation. Thus the flow control element of the ionic junction is readily changed in an arrangement that does not impose shearing stress on the membrane and does not require disassembly of electrode system components for example.

While a particular embodiment of the invention has been shown and described, various modifications thereof will be apparent to those skilled in the art, and therefore it is not intended that the invention be limited to the disclosed embodiment or to details thereof, and departures may be made therefrom within the spirit and scope of the invention as defined in the claims.

What is claimed is:

1. An electrochemical electrode system including a sensing electrode system that includes a first chamber adapted to contain a sample to be analyzed,
a reference electrode system that includes a second chamber adapted to contain an electrolyte,
and an ionic junction structure including first structure connected to said first chamber, said first structure having an opening therein, second structure connected to said second chamber, said second structure having an opening therein, said openings being in juxtaposed relation, a porous flow control member disposed between said openings, guide structure for establishing a path of straight line motion of one opening defining structure toward the other opening defining structure and alignment of the two openings with said flow control member disposed between said openings for providing a controlled liquid flow path for establishing an ionic junction between the electrolyte and the sample material to be measured by the electrode system, biasing structure for maintaining surfaces of said opening defining structures in juxtaposed clamping relation while not imposing shear force on the said flow control member interposed between said surfaces and lever structure operable to move said one opening defining structure away from said other opening defining structure along said path of straight line motion to release the clamping force imposed by said biasing structure on said flow control member.

2. The system as claimed in claim 1 wherein said member is an elongated strip, and a plurality of porous flow control sections are arranged in series along said strip such that said strip may be advanced past said juxtaposed openings to change the flow control section between said openings, and said lever structure is operative to reduce the biasing force of said biasing structure to facilitate movement of said member.

3. The system as claimed in claim 2 wherein said first structure includes inlet and outlet portions, said inlet and outlet portions being disposed in an angle to one another and said opening in said first structure being adjacent the junction of said inlet and outlet portions.

4. The system as claimed in claim 3 wherein said member is a membrane having a multiplicity of parallel passages that are substantially equal in length, the density of said passages in said member being at least about $10^8$ per square centimeter, and wherein the passage dimensions of said member are such that the flow rate of electrolyte from said chamber to said sample flow path through said passages is less than 0.1 microliter per minute per square millimeter of porous member area per centimeter head of electrolyte.

5. The system as claimed in claim 1 wherein said member is an elongated strip having a plurality of porous flow control sections arranged in series, and further including supply structure and take up structure, the leading end of said strip being in said take up structure, the trailing end of said strip being in said supply structure, and means connected to said take up structure for advancing said strip past said juxtaposed openings.

6. The system as claimed in claim 1 wherein each said flow control section has a multiplicity of parallel passages therethrough, the width of each passage being less than one-half micron such that a multiplicity of ionic junctions are adapted to be provided by each said flow control section between electrolyte and the material to be analyzed.

7. The system as claimed in claim 1 wherein said member is a membrane having a multiplicity of parallel passages that are substantially equal in length, the density of said passages in said member being at least about $10^8$ per square centimeter, and wherein the passage dimensions of said member are such that the flow rate of electrolyte from said chamber to said sample flow path through said passages is less than 0.1 microliter per minute per square millimeter of porous member area per centimeter head of electrolyte.

8. The system as claimed in claim 1 wherein said first structure includes inlet and outlet portions, said inlet and outlet portions being disposed in an angle to one another and said orifice in said first structure being adjacent the junction of said inlet and outlet portions.

9. For use with an electrochemical electrode system including a sensing electrode system that includes a first chamber adapted to contain a sample to be analyzed, and
a reference electrode system that includes a second chamber adapted to contain an electrolyte,
an ionic junction structure including first structure defining a first passage adapted to be connected to said first chamber, said first passage having an orifice therein, second structure defining a second passage adapted to be connected to said second chamber, said second passage having an orifice therein, said orifices being in juxtaposed relation, and an elongated strip having a plurality of porous flow control sections arranged in series along said strip, one of said sections being disposed between said orifices to permit restricted flow between said orifices, said strip being movable to remove said one section from between said juxtaposed orifices and concurrently to place another one of said sections between orifices to change the flow control section between said orifices.

10. The system as claimed in claim 9 wherein each said flow control section has a multiplicity of parallel passages therethrough, the width of each passage being less than one-half micron such that a multiplicity of ionic junctions are adapted to be provided by each said flow control section between electrolyte and the material to be analyzed.

11. The system as claimed in claim 10 and further including supply structure and take up structure, the leading end of said strip being in said take up structure, the trailing end of said strip being in said supply structure, and means connected to said take up structure for advancing said strip past said juxtaposed orifices.

12. The system as claimed in claim 11 and further including means for resiliently biasing said second structure against said strip, and means for reducing the biasing force to facilitate movement of said strip relative to said first passage.

13. The system as claimed in claim 12 wherein said first structure includes inlet and outlet portions, said inlet and outlet portions being disposed in an angle to one another and said orifice in said first structure being adjacent the junction of said inlet and outlet portions.

14. The system as claimed in claim 9 and further including guide structure for establishing straight line motion of said second structure toward said first structure without rotation of said second structure relative to said first structure to clamp one of said sections of said strip between said orifices and to maintain said one section under clamping pressure while not imposing shear force on said one section.

15. The system as claimed in claim 14 wherein said strip is a membrane having a multiplicity of parallel passages that are substantially equal in length, the density of said passages in said strip being at least about $10^8$ per square centimeter, and wherein the passage dimensions of said strip are such that the flow rate of electrolyte from said chamber to said sample flow path through said passages is less than 0.1 microliter per minute per square millimeter of porous strip area per centimeter head of electrolyte.

16. The system as claimed in claim 9 and further including means for resiliently biasing said second structure against said strip, and means for reducing the biasing force to facilitate movement of said strip relative to said first passage.

17. An electrode system for electrochemical analysis of a sample comprising structure defining a first chamber adapted to contain an electrolyte, structure defining a second chamber adapted to contain the material to be analyzed, each said chamber having opening defining structure in communication therewith, a flow control member carried by one of said opening defining structures and disposed over the opening of said one opening defining structure, guide structure for establishing a path of straight line motion of one of said opening defining structures toward the other of said opening defining structures and alignment of the two said openings with said flow control member disposed between said openings for providing a controlled liquid flow path for establishing an ionic junction between the electrolyte and the sample material to be measured by the electrode system, biasing structure for maintaining surfaces of said opening defining structures in juxtaposed flow control member clamping relation while not imposing shear force on the said flow control member interposed between said surfaces and lever structure operable to move said one opening defining structure away from said other opening defining structure along said path of straight line motion to release the clamping force imposed by said biasing structure on said flow control member.

* * * * *